United States Patent [19]

Camp

[11] Patent Number: 4,547,010
[45] Date of Patent: Oct. 15, 1985

[54] MECHANICAL WEED REMOVER

[76] Inventor: Walter M. Camp, P.O. Box 620, Holly Springs, Ga. 30142

[21] Appl. No.: 586,557

[22] Filed: Mar. 6, 1984

[51] Int. Cl.[4] .............................................. A01B 1/18
[52] U.S. Cl. ................................................... 294/50.9
[58] Field of Search ................... 294/50.9, 50.5, 50.6, 294/50.8, 51, 104, 19 R; 56/332, 333, 334, 335, 336; 172/378; 7/114

[56] References Cited

U.S. PATENT DOCUMENTS

| | | | |
|---|---|---|---|
| 1,908,322 | 5/1933 | Cook | 294/50.9 |
| 2,029,155 | 1/1936 | Cervenko et al. | 294/50.9 |
| 2,373,872 | 4/1945 | Couture | 294/50.9 |
| 2,575,638 | 11/1951 | Price | 294/50.9 |
| 2,790,670 | 4/1957 | Sheets | 294/50.9 |
| 3,387,877 | 6/1968 | Christodolu | 294/50.9 |

*Primary Examiner*—James B. Marbert
*Attorney, Agent, or Firm*—Harvey B. Jacobson

[57] ABSTRACT

A mechanical weed remover comprises an elongate, length-adjustable shaft with pivotal weed-gripping jaws at its lower end and handle grips at its upper end. The handle grips include means for manipulating the jaws into weed-gripping engagement, and the adjustable nature of the shaft allows it to be used comfortably in standing position by users of different heights. The device also includes a facility whereby the jaws may be releasably locked in weed-gripping engagement, and the jaws may be designed to prevent scraping up of top soil when gripping onto a weed.

14 Claims, 6 Drawing Figures

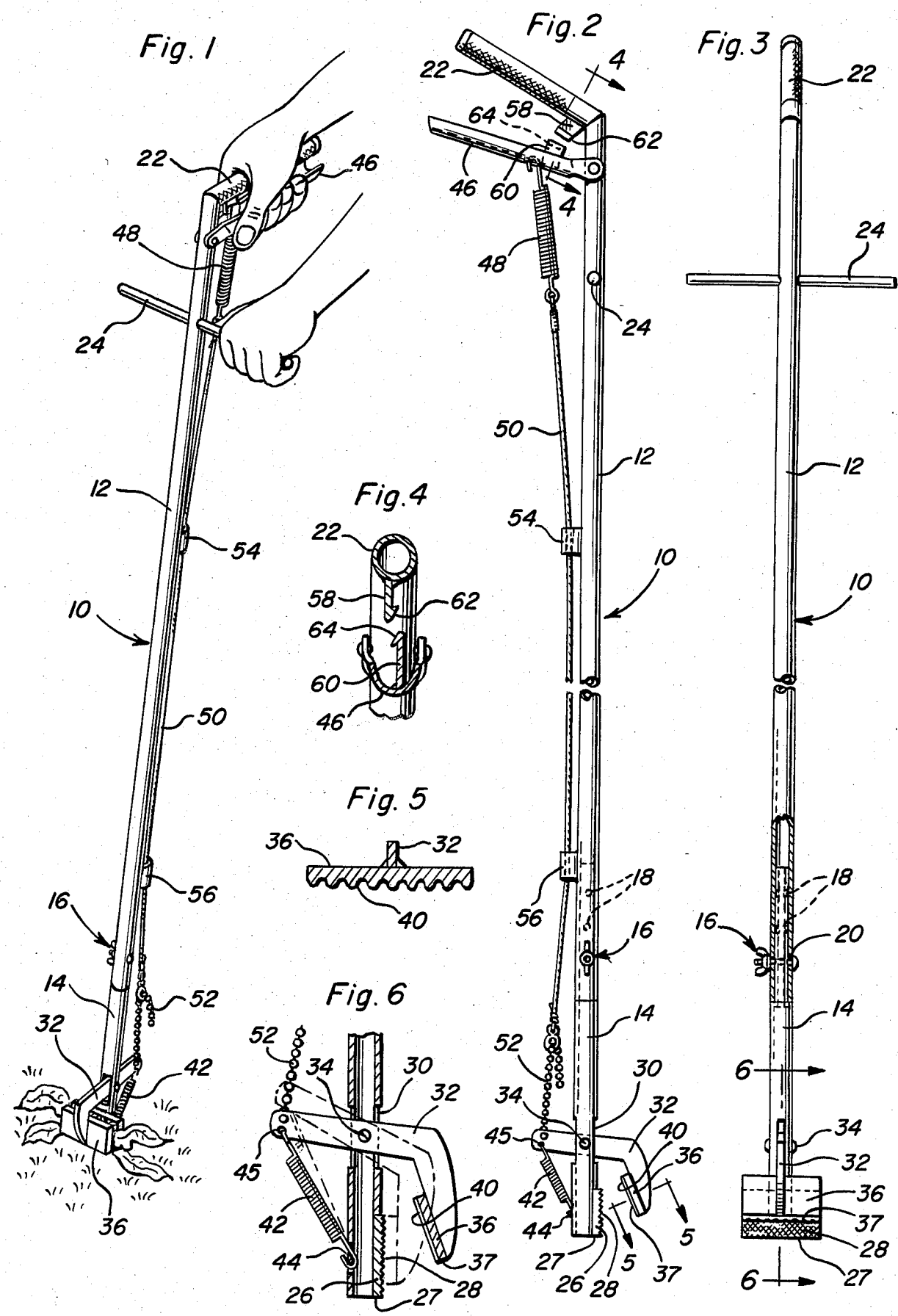

MECHANICAL WEED REMOVER

BACKGROUND OF THE INVENTION

This invention relates to a labor saving device enabling a user mechanically to remove garden weeds and the like in an expeditious manner.

Weeding is generally a time consuming and burdensome chore and included among objects of the invention are one or more of the following namely, the provision of a mechanical weed remover for simplifying this task which enables a user to remove weeds without having to kneel down or squat, which will not gather up top soil while extracting weeds, which can be easily and comfortably manipulated, and which can be releasably clamped onto a weed being gripped until positively released by the user.

STATEMENT OF PRIOR ART

The following U.S. Patents relate to weed extractors and the like, none of which has the features of the present invention.
U.S. Pat. No. 2,770,483, Patnaude, November, 1956;
U.S. Pat. No. 2,807,495, Pillstrom, September, 1957;
U.S. Pat. No. 3,152,788, Hardwidge, October 1964;
U.S. Pat. No. 3,264,028, Rasmussen, August, 1966;
U.S. Pat. No. 3,265,429, Shatt, August, 1966;
U.S. Pat. No. 3,276,805, Lambert, October, 1966;
U.S. Pat. No. 4,157,198, McDaniels, June, 1979.

SUMMARY OF THE INVENTION

A mechanical weed remover in accordance with the invention comprises an elongate shaft or shank means having pivotal jaw means at its lower end, and operating handle means at its upper end connected to the jaw means through a suitable linkage enabling a user to operate the jaw means from the handle end of the device while in a standing position, the jaw means being adapted for releasably gripping weeds therein.

Particular features of the invention reside (either singly or in combination) in means for adjusting the length of the device so that it may comfortably be operated by persons of different height, a jaw design which avoids scraping up top soil when gripping a weed, a handle structure which facilitates manipulation of the device, and a lock mechanism for releasably clamping the jaws onto a weed when it is removed.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 1 is a perspective in-use view of a mechanical weed remover in accordance with the invention.

FIG. 2 is a side elevational view of the weed remover.

FIG. 3 is a front elevational view thereof.

FIG. 4 is an enlarged side elevational view of the lower end of the weed remover.

FIG. 5 is a sectional view on line 5—5 of FIG. 4.

FIG. 6 is a sectional view on line 6—6 of FIG. 2.

DESCRIPTION OF PREFERRED EMBODIMENT

The illustrated weed remover 10 includes an elongate two-part shaft or shank comprising an upper tubular member 12 and a lower tubular member 14 telescopically received in the lower end of member 12. A screw and wing nut assembly 16 and a series of openings 18 in member 14 which may be selectively brought into alignment with opening 20 in member 12, allow the length of the shank to be adjusted to suit a user's height. Typically the length of the shank may be varied between about 30 inches and 36 inches, and members 12 and 14 may be formed from aluminum tubing or the like.

A hand grip 22 is formed on a bent over upper end section of member 12, and a T-bar 24 is provided a short distance down the shank so that the hand grip and T-bar together provide a two-handed handle assembly for the device as illustrated in FIG. 1. The T-bar allows the device to be used in like manner by left and right handed users.

At the base of member 14 is provided a rectangular stationary jaw member 26, preferably having a knurled or ridged surface 28 and, for example, being about three inches in width and one inch in height. Adjacent jaw member 26 a slot 30 is formed in member 14 to mount a cranked pivotal jaw 32 by means of a pivot pin 34. Jaw 32 carries a pivotal jaw member 36 to cooperate with stationary jaw member 26 for gripping weeds therebetween, and has a knurled or ridged surface 40 complementary to surface 28. In accordance with the invention, the respective jaw members may be configured and disposed such that when jaw member 36 is closed on jaw member 26, the lower edge 37 of jaw member 36 is offset above the lower edge 27 of jaw member 26 by about $\frac{3}{8}$ inch (as shown by the dotted line position in FIG. 6). The purpose of the offset is to avoid scraping up top soil with the pivotal jaw when gripping onto a weed with the bottom edge of jaw member 26 in ground engagement. Also, the lower edge 37 of jaw member 36 is preferably radiused to assist in this respect.

The jaw members are urged apart by means of a coil spring 42 connected between a pin 44 or the like at the bottom end of member 14, and an opening 45 in the back of jaw 32. An operating mechanism for moving jaw 32 into gripping relation with jaw member 26 against the action of spring 42 comprises a hand-lever 46 pivoted to member 12 adjacent hand grip 22, and a linkage between hand lever 46 and the back end of jaw 32 comprising a coil spring 48, a cable 50 connected to the coil spring, and a length-adjustable chain 52 connected at one end to the cable and at the other end to jaw 32. The length of chain 52 may be suitably adjusted to accommodate length adjustments made between members 12 and 14 as previously described. Cable 50 is guided through brackets 54,56 on member 12.

In accordance with a futher feature of the invention, means is provided for releasably locking the jaw members in clamped engagement, such means comprising respective claw-type grips 58,60 with complementary ramp elements 62,64 (FIG. 4) formed on hand grip 22 and hand lever 46 in like manner to clamps used on surgical forceps and the like. The ramp elements engage and lock when hand lever 46 is pressed toward hand grip 22 to bring the jaw members into gripping relation, and can be disengaged to release the jaws by lateral displacement of hand lever 46. A degree of play is provided in the hand lever for this purpose.

It will be apparent that in use, the jaw members may be clamped on a weed simply by pressing hand lever 46 toward the hand grip 22, thereby engaging ramp elements 62 and 64. The weed may then be extracted from the ground and deposited in a required location by releasing the ramp elements as described above. The provision of the T-bar in conjunction with hand grip 22 facilitates manipulation of the device, and the offset jaw design prevents unwanted scraping up of top soil. Further, the length-adjustment feature of the device is beneficial in insuring comfort for users of different heights.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A mechanical weed removal device comprising a pair of relatively movable jaw members, and means for moving the jaw members into and out of weed-gripping engagement, wherein terminal ends of the respective jaw members are respectively offset in closed position of the jaw members to prevent scraping up top soil when closing the jaw members with one of the terminal ends in ground engagement wherein one of said jaw members comprises a stationary jaw member on one end of an elongate shaft means, the other of said jaw members being mounted on the shaft means for movement toward and away from said one jaw member, the terminal edge of the stationary jaw member overlapping the terminal edge of the other jaw member so that when the terminal edge of the one jaw member is in ground engagement, the terminal edge of the other jaw member clears the ground, the device further including handle means on the other end of said shaft means, the handle means including operating means for the other of said jaw members, wherein the operating means comprises a hand lever pivoted on the shaft means and connected to the other jaw member by a linkage means extending along the shaft means, and the device including engageable and disengageable locking elements on the hand lever and a hand grip portion of the shaft means respectively for releasably clamping the jaw members in weed-gripping engagement, wherein the locking elements comprise complementary opposed ramp-like elements mutually cammed into locking engagement when the hand lever is moved towards the hand grip and released by relative lateral displacement of the hand lever and hand grip.

2. The invention of claim 1 wherein the other jaw member is mounted on the shaft means for pivotal movement toward and away from the one jaw member.

3. The invention of claim 2 wherein the terminal edge of the other jaw member is radiused.

4. The invention of claim 1 wherein the hand lever is operatively connected to a movable one of said jaws by linkage means extending along the length of the shaft means.

5. The invention of claim 4 wherein the linkage means includes a spring means and elongate flexible means connected between the hand lever and the movable jaw.

6. The invention of claim 5 wherein the shaft means comprises means for adjusting the length thereof and the elongate flexible means also includes means for adjusting the length thereof to conform with the shaft means.

7. The invention of claim 5 including biasing means urging the jaws toward open position.

8. A mechanical weed removal device comprising a pair of relatively movable jaw members, and means for moving the jaw members into and out of weed-gripping engagement, wherein terminal ends of the respective jaw members are respectively offset in closed positions of the jaw members to prevent scraping up top soil when closing the jaw members with one of the terminal ends in ground engagement wherein one of said jaw members comprises a stationary jaw member on one end of an elongate shaft means, the other of said jaw members being mounted on the shaft means for movement toward and away from said one jaw member, the terminal edge of the stationary jaw member overlapping the terminal edge of the other jaw member so that when the terminal edge of the one jaw member is in ground engagement, the terminal edge of the other jaw member clears the ground, the device further including handle means on the other end of said shaft means, the handle means including operating means for the other of said jaw members, wherein the operating means comprises a hand lever pivoted on the shaft means and connected to the other jaw member by a linkage means extending along the shaft means, the device including means for adjusting the length of the shaft means, and means for making equivalent length adjustments to the linkage means enabling the device to be used for weed removal by persons of different height from a standing position.

9. The invention of claim 8 wherein the shaft means comprises a pair of telescopically mounted shaft members, the adjusting means comprising means for fixing the shaft members in different telescopic positions, the linkage means comprising elongate flexible means with a length-adjustable section therein.

10. The invention of claim 9 wherein the linkage means extends between a pivotal jaw of said jaw means and a pivotal hand lever of said handle means and comprises a spring attached to the hand lever, a cable attached to the spring, and a length-adjustable chain connecting the cable to the pivotal jaw.

11. The invention of claim 10 including means biasing the pivotal jaw toward open position.

12. The invention of claim 10 wherein the pivotal jaw cooperates with a stationary jaw of the jaw means, and a terminal edge of the pivotal jaw is offset above a terminal edge of the stationary jaw to avoid scraping up top soil when the jaws are closed with the terminal edge of the stationary jaw in ground engagement.

13. The invention of claim 8 wherein the handle means comprises a hand grip and a hand lever movable toward the hand grip to close the jaw means, the device including complementary locking elements on the hand lever and hand grip, the locking elements being mutually engaged by movement of the hand lever toward the hand grip in order to clamp the jaw means in weed-gripping relation.

14. The invention of claim 8 wherein the handle means comprises a hand grip at the end of the shaft means and a T-bar extending laterally from the shaft means below the hand grip.

* * * * *